United States Patent
Chila et al.

(10) Patent No.: US 8,646,277 B2
(45) Date of Patent: Feb. 11, 2014

(54) COMBUSTOR LINER FOR A TURBINE ENGINE WITH VENTURI AND AIR DEFLECTOR

(75) Inventors: Ronald James Chila, Greenville, SC (US); Donald Timothy Lemon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1029 days.

(21) Appl. No.: 12/708,736

(22) Filed: Feb. 19, 2010

(65) Prior Publication Data

US 2011/0203287 A1    Aug. 25, 2011

(51) Int. Cl.
*F23R 3/02*    (2006.01)
*F23R 3/54*    (2006.01)

(52) U.S. Cl.
USPC .................................. 60/760; 60/758; 60/752

(58) Field of Classification Search
USPC ............ 60/804, 746–747, 737, 752–760, 748
See application file for complete search history.

(56) References Cited

U.S. PATENT DOCUMENTS

| | | | |
|---|---|---|---|
| 4,845,940 A * | 7/1989 | Beer | 60/732 |
| 5,117,636 A * | 6/1992 | Bechtel et al. | 60/738 |
| 5,253,478 A * | 10/1993 | Thibault et al. | 60/733 |
| 5,454,221 A * | 10/1995 | Loprinzo | 60/772 |
| 6,427,446 B1 * | 8/2002 | Kraft et al. | 60/737 |
| 6,772,595 B2 * | 8/2004 | Martling et al. | 60/737 |
| 7,707,836 B1 * | 5/2010 | Barnes et al. | 60/755 |
| 2004/0112058 A1 * | 6/2004 | Garrido et al. | 60/752 |
| 2006/0168967 A1 * | 8/2006 | Simons et al. | 60/772 |
| 2006/0260316 A1 * | 11/2006 | Stuttaford | 60/737 |
| 2008/0295521 A1 | 12/2008 | Simons et al. | |
| 2009/0019854 A1 * | 1/2009 | Simons et al. | 60/738 |
| 2009/0019855 A1 * | 1/2009 | Venkataraman et al. | 60/738 |
| 2009/0053054 A1 * | 2/2009 | Grooms et al. | 415/208.1 |

* cited by examiner

*Primary Examiner* — William H Rodriguez
*Assistant Examiner* — Carlos A Rivera
(74) *Attorney, Agent, or Firm* — Nixon & Vanderhye P.C.

(57) ABSTRACT

A combustor liner for a combustor of a turbine engine includes a single-walled generally cylindrical liner that extends from a head end to an aft end. A venturi is formed on the combustor liner at a location between the head and aft ends. The venturi is formed by first and second straight portions of the combustor liner that angle inward to form a reduced diameter portion. The combustor liner may also include an air deflector to deflect air down onto the exterior of the reduced diameter portion of the single-walled combustor liner. The combustor liner may also include dilution holes, and turbulator rings.

19 Claims, 5 Drawing Sheets

COMBUSTOR LINER FOR A TURBINE ENGINE WITH VENTURI AND AIR DEFLECTOR

BACKGROUND OF THE INVENTION

Turbine engines used in the power generation industry typically include a compressor section surrounded by a plurality of combustors. The combustors are arranged in a concentric ring around the exterior of the compressor. Compressed air from the compressor section is fed into the combustors where it is mixed with fuel. The fuel-air mixture is then burned in the combustors, and the hot combustion gases are routed into the turbine section of the engine to provide the motive force for running the turbine.

A typical combustor of a turbine engine can include a combustor liner which surrounds the combustion zone where the fuel-air mixture is burned. Some types of combustors include a venturi inside the combustor liner, which is basically a reduced diameter portion of the interior of the combustor liner.

The reduced diameter portion of a combustor liner which forms a venturi often requires specialized cooling to prevent the materials that comprise the venturi from being damaged by the hot combustion gases. This is usually achieved by providing a two-walled structure, where cooling air passes through the annular space between the inner and outer walls of the venturi section to cool the venturi section. Unfortunately, this structure is complex, and can be difficult and expensive to manufacture. In addition, the complexity of the two-walled venturi section often leads to air leaks, which can reduce the overall efficiency of the turbine, as well as lead to the generation of undesirable combustion by-products.

BRIEF DESCRIPTION OF THE INVENTION

In one aspect, the invention is embodied in a combustor liner for a combustor of a turbine engine, where the combustor liner is formed from a single-walled generally cylindrical liner that extends from a head end to an aft end. The combustor liner includes a venturi formed in an interior of the liner between the head end and the aft end. The venturi is formed by a first inclined portion of the single-walled liner that reduces in diameter while progressing in the aft direction and a second inclined portion of the single-walled liner that increases in diameter while progressing in the aft direction. An aft end of the first inclined portion is joined to a head end of the second inclined portion.

In another aspect, the invention is embodied in a combustor liner for a combustor of a turbine engine where the combustor liner is formed from a single-walled liner that extends from a head end to an aft end. A reduced diameter portion is formed in the single-walled liner between the head end and the aft end, the reduced diameter portion forming a venturi in the interior of the liner. An air deflector is mounted on an exterior of the single-walled liner such that there is an annular space between an interior of the air deflector and an exterior of the liner. The air deflector deflects a portion of a flow of air that is passing along the exterior of the liner from the aft end toward the head end onto an exterior of the reduced diameter portion of the liner.

DETAILED DESCRIPTION OF THE INVENTION

Figure 1:
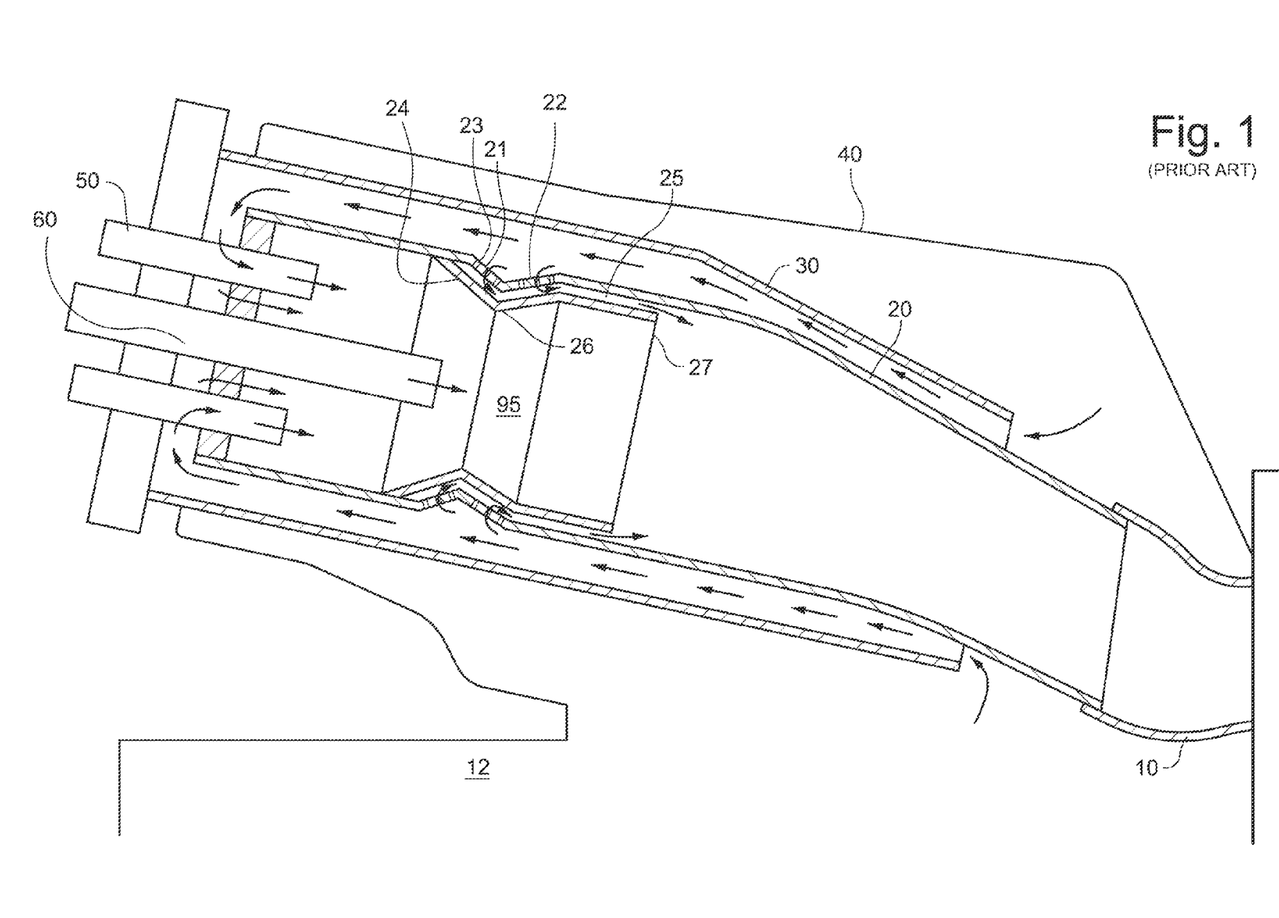
FIG. 1 is a cross-sectional view of a typical combustor which includes a combustor liner with a two-walled venturi.

FIG. 1 shows a cross-sectional view of a typical combustor used in a turbine engine. The combustor is located adjacent a compressor section 12 of the turbine engine. The combustor includes a transition piece 10 which leads to a turbine section of the engine. A combustor liner 20 is connected to the transition piece 10. The combustor liner 20 surrounds a combustion zone 95 where the fuel-air mixture is burned.

At the head end of the combustor, a plurality of primary fuel nozzles 50 are located in a circular pattern around the periphery of the combustor. The combustor may also include a secondary nozzle 60 positioned at the center of the combustor. Fuel is delivered into the interior of the combustor liner 20 through the fuel nozzles 50, 60.

A flow sleeve 30 is located around the exterior of the combustor liner 20. A combustor housing 40 surrounds the exterior of the flow sleeve 30. An annular space is formed between the exterior of the combustor liner 20 and an interior of the flow sleeve 30. Compressed air from the compressor section 12 of the turbine engine flows into and through this annular space, as shown by the arrows in FIG. 1.

The compressed air enters the aft end of the annular space between the combustor liner 20 and the flow sleeve 30 and then travels toward the head end of the combustor. When the compressed air reaches the head end, it turns 180° and then enters into the interior of the combustor liner 20. The compressed air then mixes with fuel delivered by the fuel nozzles 50, 60, and the fuel-air mixture is burned in the combustion zone 95.

As illustrated in FIG. 1, a venturi 26 is located in the interior of the combustor liner 20. The venturi 26 is formed by a double-walled structure which includes an inner wall 24 and angled outer walls 21, 22. Air holes 23 are formed in the angled outer walls 21/22 to allow air flowing through the annular space between the combustor liner 20 and the flow sleeve 30 to pass through the holes 23 and into the space 25 formed between the angled outer walls 21/22 and the inner wall 24 of the venturi 26.

The double-walled structure of the venturi is designed to help cool the venturi 26, to thereby prevent the venturi from overheating and becoming damaged. As shown by the arrows in FIG. 1, the air passing through the holes 23 in the angled outer walls 21/22 flows along the annular space between the inner and outer walls of the venturi, and this air ultimately exits at the aft end of the inner wall 24 of the venturi and joins the burning fuel-air mixture in the interior of the combustor liner 20. As a result, the holes 23 in the angled outer walls 21/22 of the venturi ultimately admit air into the interior of the combustor liner 20.

As noted above, providing this double-walled structure for the venturi is relatively expensive. The double-walled structure is difficult to manufacture, and because of the multiple angles and pieces which are used to form this double-walled venturi, there can be leaks and deterioration of the various parts.

Figure 2:
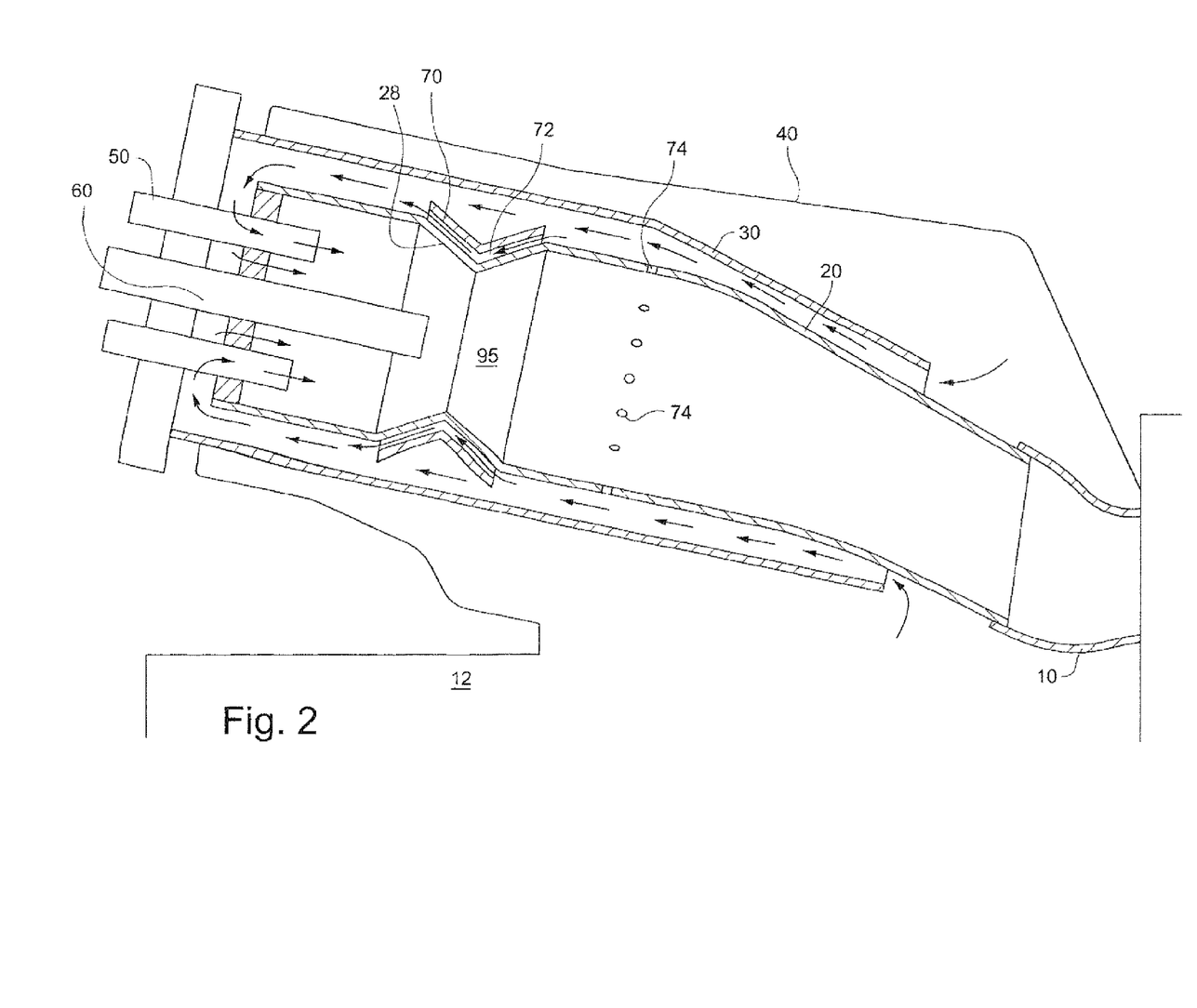
FIG. 2 is a cross-sectional view of a combustor which includes a single-walled combustor liner with a venturi.

FIG. 2 shows an alternate structure for a combustor liner that includes a venturi. In this structure, the entire combustor liner, including the venturi, is formed from a single-walled structure that extends from the head end to the aft end of the combustor. As shown in FIG. 2, the combustor liner 20 is still surrounded by a flow sleeve 30, and compressed air from the compressor section 12 still runs through the annular space between the combustor liner 20 and the flow sleeve 30.

In the combustor liner 20 illustrated in FIG. 2, the venturi 22 is formed by two angled walls which form a reduced diameter portion 28 along the length of the single-walled combustor liner 20. The compressed air flowing along the annular space between the combustor liner 20 and the flow sleeve 30 will cool the exterior of the combustor liner 20, including the reduced diameter portion 28 which forms the venturi.

To ensure that a flow of air is directed down onto the exterior of the reduced diameter portion 28, the combustor may include an air deflector 70. In the embodiment illustrated in FIG. 2, the air deflector 70 includes two angled walls which are generally parallel to and aligned with the two angled walls which form the reduced diameter portion 28 of the combustor liner 20. The air deflector deflects a portion of the air passing through the annular space between the combustor liner 20 and the flow sleeve 30 down into the reduced diameter portion 72 to cool the exterior wall of the venturi portion of the single-walled combustor liner 20.

As explained above, and with reference back to FIG. 1, the two-walled venturi structures ultimately resulted in a portion of the air from a compressor section being delivered into the combustion zone 95 of the embodiment shown in FIG. 1 at a location just downstream of the aft end 27 of the inner wall 24 of the venturi. To provide a similar inflow of air at this location in the embodiment illustrated in FIG. 2, a plurality of dilution holes 74 may be formed through the single-walled combustor liner 20.

In the embodiment illustrated in FIG. 2, the dilution holes 74 are formed in an annular ring around the exterior of the combustor liner 20. This allows air from the annular space between the combustor liner 20 and the flow sleeve 30 to flow into the interior of the combustor liner 20 at a location generally similar to the location where the cooling air used to cool the venturi of the embodiment shown in FIG. 1 would have been delivered. Thus, the inclusion of the dilution holes 74 in the embodiment illustrated in FIG. 2 leads to generally similar combustion parameters as would be present in the embodiment illustrated in FIG. 1.

Figure 3:
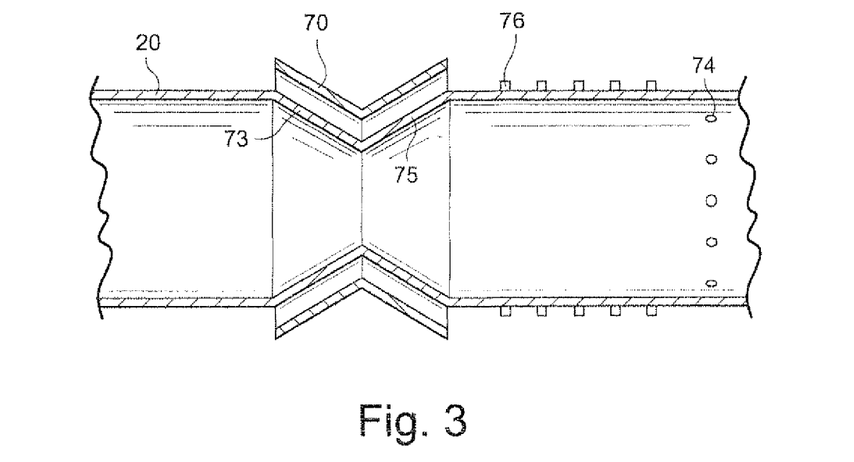
FIG. 3 is a cross-sectional view of a portion of an embodiment of a single-walled combustor liner which includes an air deflector.

The air deflector 70 used to deflect cooling air down onto the exterior of the reduced diameter portion 28 of a single-walled combustor liner 20 can take a variety of different forms. FIG. 3 shows an embodiment where the air deflector 70 is formed of two straight sections which are angled with respect to each other, and where the two straight sections are generally parallel to the angled sections 73, 75 of the reduced diameter portion of the single-walled combustor liner 20 that forms the venturi. This embodiment is generally similar to the one shown in FIG. 2.

The combustor liner shown in FIG. 3 also includes a plurality of turbulator rings 76. The turbulator rings 76 are projections formed on the exterior surface of the single-walled combustor liner 20. The turbulator rings 76 extend around the exterior of the combustor liner 20. As illustrated in FIG. 3, a plurality of such turbulator rings 76 could be spaced from each other along the aft portion of the combustor liner 20.

The turbulator rings act to induce turbulent air flow in the compressed air passing through the annular space between the combustor liner 20 and the flow sleeve 30. The turbulent air flow helps to improve the cooling effect provided by this air, thereby lowering the overall temperature of the combustor liner 20.

Although the embodiment illustrated in FIG. 3 includes five turbulator rings which are evenly spaced along an aft portion of the combustor liner 20, different numbers of the turbulator rings could be provided, and they might be spaced differently. Moreover, instead of providing projections on the exterior of the combustor liner, it would also be possible to cut grooves into the surface of the combustor liner 20 to induce turbulent air flow to improve the cooling effect. In some embodiments, a combination of grooves and projections could be used to induce turbulent air flow. Still further, rather than providing concentric rings, either as projections or depressions, one could also provide a plurality of discrete projections or recesses that do not form rings around the exterior of the combustor liner.

Figure 4:
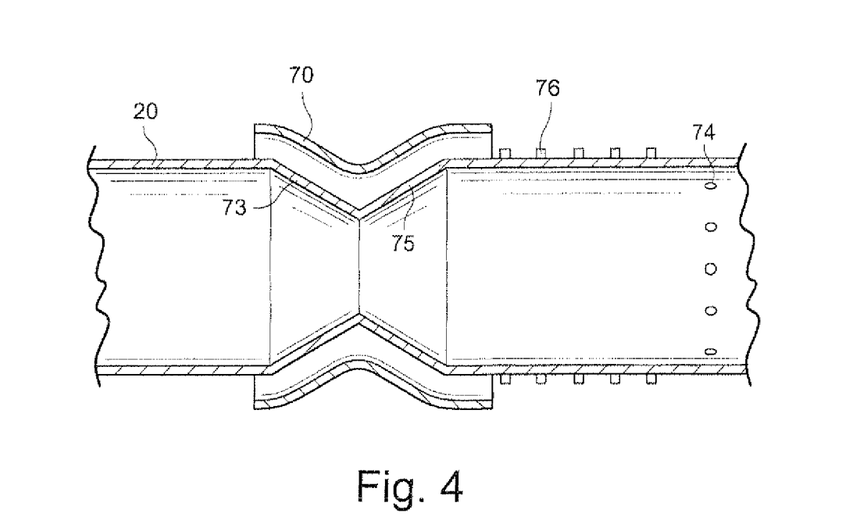
FIG. 4 is a cross-sectional view of a portion of another embodiment of a single-walled combustor liner which includes an air defector.

The embodiment illustrated in FIG. 4 is similar to the embodiment illustrated in FIG. 3. However, in the embodiment illustrated in FIG. 4, the air deflector 70 includes curved portions, rather than straight angled portions. Curving the air deflector as shown in FIG. 4 may facilitate the flow of compressed air, or decrease flow resistance.

In addition, in the embodiment illustrated in FIG. 4, the aft and head ends of the air deflector 70 extend beyond the aft and head ends of the angled walls 73/75 that form the venturi. It would also be possible to modify any other of the disclosed embodiments so that the ends of the air deflector extend beyond the head and aft ends of the venturi.

Figure 5:
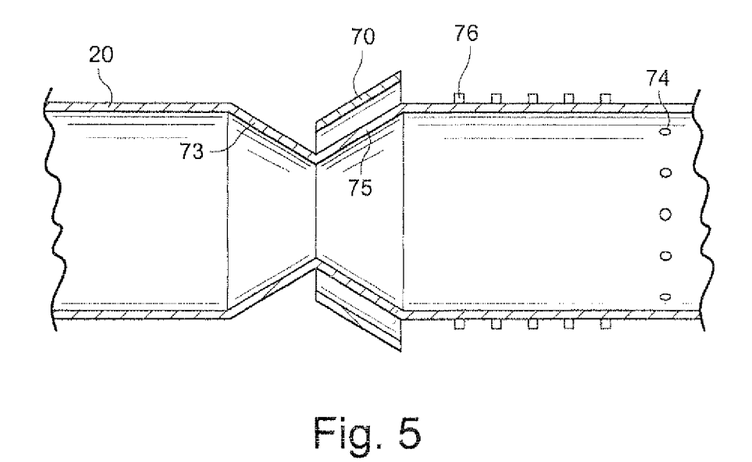
FIG. 5 is a cross-sectional view of a portion of another embodiment of a single-walled combustor liner which includes an air deflector.

In the embodiment illustrated in FIG. 5, the air deflector 70 is formed from a single straight section provided at the aft end of the venturi. The air flowing along the annular space between the combustor liner 20 and the flow sleeve 30 will be traveling towards the left in the view provided in FIG. 5. Thus, the air deflector 70 in FIG. 5 will act to deflect a portion of the air flow down into the depression formed on the exterior of the combustor liner 20 by the angled portions 73 and 75 of the venturi. Once the air has been deflected downward in this fashion, much of the cooling effects provided by the deflected air stream will have been achieved. Thus, it may not be necessary to provide anything more than the small air deflector 70 illustrated in FIG. 5 to achieve good cooling of the reduced diameter portion of the combustor liner 20.

Figure 6:
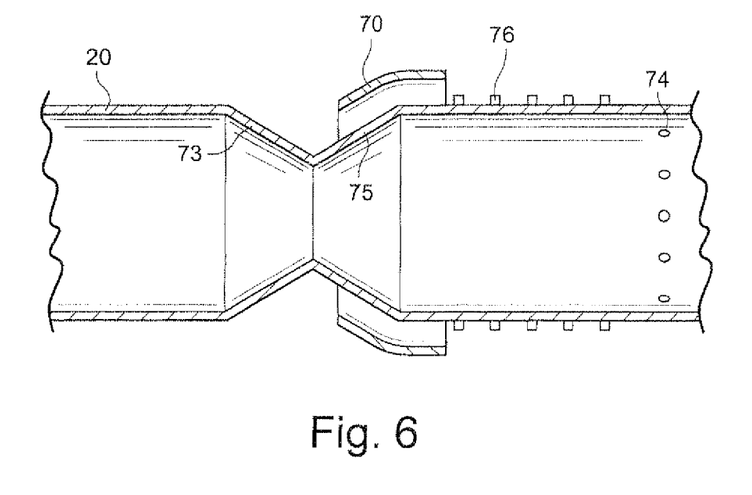
FIG. 6 is a cross-sectional view of a portion of yet another embodiment of a single-walled combustor liner which includes an air deflector.

FIG. 6 illustrates another embodiment similar to the one shown in FIG. 5. However, in the embodiment shown in FIG. 6, the aft end of the air deflector 70 extends further in the aft direction than the aft wall 75 of the venturi. In addition, the head end of the air deflector 70 does not extend all the way in the head end direction as the aft angled wall 75 of the venturi. Further, the air deflector in FIG. 6 is slightly curved to help direct a portion of the air flow in the desired direction onto the reduced diameter portion of the combustor liner 20.

Figure 7:
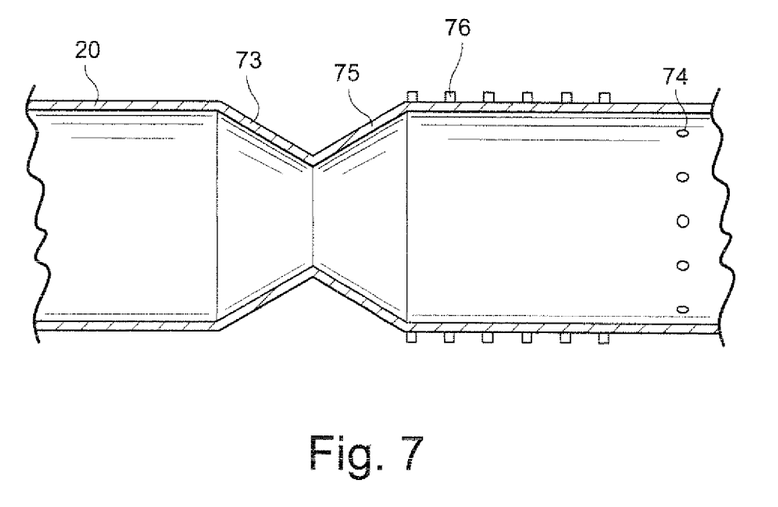
FIG. 7 is a cross-sectional view of a portion of a single-walled combustor liner which includes a venturi.

FIG. 7 illustrates yet another embodiment of a single-walled combustor liner 20 which includes a venturi formed from two angled walls 73, 75. In this embodiment, no air deflector is provided. The flow of air along the exterior of the combustor liner is sufficient to cool even the reduced diameter portion formed by the two angled walls 73, 75.

It may be advantageous to place a turbulator ring 76 (or another similar structure) at the aft end of the reduced diameter portion to induce turbulent air flow at this location. Inducing turbulent airflow at this location may help to cause a portion of the air flow to be deflected down onto the reduced diameter portion formed by the angled walls 73, 75 of the venturi.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustor liner for a combustor of a turbine engine, comprising:
    a generally cylindrical liner that extends from a head end to an aft end;
    a venturi formed in an interior of the liner between the head end and the aft end, the venturi being formed by:
        a first inclined portion of the liner that reduces in diameter while progressing in the aft direction; and
        a second inclined portion of the liner that increases in diameter while progressing in the aft direction, wherein an aft end of the first inclined portion is joined to a head end of the second inclined portion; and
    an air deflector that is mounted on an exterior of the liner such that it at least partially surrounds at least one of the first and second inclined portions and such that an annular space is formed between an inner side of the air deflector and an outer side of the liner, wherein the air deflector is configured to deflect a portion of a flow of air that is passing along the exterior of the liner from the aft end to the head end onto a circumferential depression formed on an exterior the of the liner by outer sides of the first and second inclined portions, and wherein air passing through the annular space continues to travel along the exterior of the liner toward the head end of the liner where it turns 180° and enters the interior of the combustor liner.

2. The combustor liner of claim 1, wherein the generally cylindrical liner includes an aft cylindrical portion that is joined to the aft end of the second inclined portion, and wherein a plurality of dilution holes are formed in the aft cylindrical portion.

3. The combustor liner of claim 2, wherein the plurality of dilution holes are arranged in a ring that extends around a circumference of the aft cylindrical portion, and wherein the ring of dilution holes are spaced away from the aft end of the second inclined portion in the aft direction.

4. The combustor liner of claim 1, wherein the generally cylindrical liner includes an aft cylindrical portion that is joined to the aft end of the second inclined portion, and wherein at least one turbulator ring is located on the aft cylindrical portion, each at least one turbulator ring projecting from the exterior of the aft cylindrical portion and extending around a circumference of the aft cylindrical portion.

5. The combustor liner of claim 4, wherein the at least one turbulator ring comprises a plurality of turbulator rings that are spaced from one another along the aft cylindrical portion.

6. The combustor liner of claim 1, wherein the air deflector comprises:
    a first inclined portion that reduces in diameter while progressing in the aft direction, wherein the first inclined portion of the air deflector is aligned with the first inclined portion of the liner; and
    a second inclined portion that increases in diameter while progressing in the aft direction, wherein an aft end of the first inclined portion of the air deflector is joined to a head end of the second inclined portion of air deflector, and wherein the second inclined portion of the air deflector is aligned with the second inclined portion of the liner.

7. The combustor liner of claim 6, wherein a head end of the first inclined portion of the air deflector extends in the head direction beyond a head end of the first inclined portion of the cylindrical liner.

8. The combustor liner of claim 7, wherein an aft end of the second inclined portion of the air deflector extends in the aft direction beyond an aft end of the second inclined portion of the cylindrical liner.

9. The combustor liner of claim 6, wherein an aft end of the second inclined portion of the air deflector extends in the aft direction beyond an aft end of the second inclined portion of the cylindrical liner.

10. The combustor liner of claim 1, wherein the air deflector comprises an inclined portion that increases in diameter while progressing in the aft direction, wherein the inclined portion of the air deflector is aligned with the second inclined portion of the cylindrical liner.

11. The combustor liner of claim 10, wherein the inclined portion of the air deflector is generally parallel with the second inclined portion of the cylindrical liner.

12. The combustor liner of claim 10, wherein an aft end of the inclined portion of the air deflector extends further aft than an aft end of the second inclined portion of the cylindrical liner.

13. The combustor liner of claim 10, wherein a head end of the inclined portion of the air deflector does not extend as far in the head end direction as the head end of the second inclined portion of the cylindrical liner.

14. The combustor liner of claim 1, wherein the generally cylindrical liner includes an aft cylindrical portion that is joined to the aft end of the second inclined portion, and wherein a plurality of dilution holes are formed in the aft cylindrical portion.

15. The combustor liner of claim 14, wherein the plurality of dilution holes are arranged in a ring that extends around a circumference of the aft cylindrical portion, and wherein the ring of dilution holes are spaced away from the aft end of the second inclined portion in the aft direction.

16. The combustor liner of claim 1, wherein the generally cylindrical liner includes an aft cylindrical portion that is joined to the aft end of the second inclined portion, and wherein at least one turbulator ring is located on the aft cylindrical portion, each at least one turbulator ring projecting from the exterior of the aft cylindrical portion and extending around a circumference of the aft cylindrical portion.

17. The combustor liner of claim 16, wherein the at least one turbulator ring comprises a plurality of turbulator rings that are spaced from one another along the aft cylindrical portion.

18. A combustor liner of claim 1, provided on a turbine engine.

19. A combustor liner for a combustor of a turbine engine, comprising:
    a liner that extends from a head end to an aft end, wherein a reduced diameter portion is formed in the liner between the head end and the aft end, the reduced diameter portion forming a venturi in the interior of the liner; and
    an air deflector mounted on an exterior of the liner such that it at least partially surrounds the reduced diameter portion of the liner and such that there is an annular space between an interior of the air deflector and an exterior of the liner, wherein the air deflector deflects a portion of a flow of air that is passing along the exterior of the liner from the aft end toward the head end onto an exterior of the reduced diameter portion of the liner, and wherein air passing through the annular space continues to travel along the exterior of the liner and toward the head end of the liner where it turns 180° and enters an interior of the liner.

* * * * *

UNITED STATES PATENT AND TRADEMARK OFFICE
CERTIFICATE OF CORRECTION

| | | |
|---|---|---|
| PATENT NO. | : 8,646,277 B2 | Page 1 of 1 |
| APPLICATION NO. | : 12/708736 | |
| DATED | : February 11, 2014 | |
| INVENTOR(S) | : Chila et al. | |

It is certified that error appears in the above-identified patent and that said Letters Patent is hereby corrected as shown below:

In the Specification,

At column 2, line 63, insert --27-- between "at the aft end" and "of the inner wall"

Signed and Sealed this
Seventeenth Day of February, 2015

Michelle K. Lee
*Deputy Director of the United States Patent and Trademark Office*